United States Patent
Hansen et al.

(10) Patent No.: US 10,269,350 B1
(45) Date of Patent: Apr. 23, 2019

(54) RESPONSIVE ACTIVATION OF A VEHICLE FEATURE

(71) Applicant: GM GLOBAL TECHNOLOGY OPERATIONS LLC, Detroit, MI (US)

(72) Inventors: Cody R. Hansen, Shelby Township, MI (US); Dustin H. Smith, Auburn Hills, MI (US); Xu Fang Zhao, LaSalle (CA); Gaurav Talwar, Novi, MI (US)

( * ) Notice: Subject to any disclaimer, the term of this patent is extended or adjusted under 35 U.S.C. 154(b) by 37 days.

(21) Appl. No.: 15/784,377

(22) Filed: Oct. 16, 2017

(51) Int. Cl.
| | |
|---|---|
| G06F 3/16 | (2006.01) |
| G10L 15/22 | (2006.01) |
| G10L 15/30 | (2013.01) |
| H04M 3/493 | (2006.01) |

(52) U.S. Cl.
CPC .............. *G10L 15/22* (2013.01); *G06F 3/165* (2013.01); *G10L 15/30* (2013.01); *H04M 3/493* (2013.01); *G10L 2015/223* (2013.01)

(58) Field of Classification Search
CPC ... G10L 15/22; G10L 15/30; G10L 2015/223; G10L 704/275; G06F 3/165
See application file for complete search history.

(56) References Cited

U.S. PATENT DOCUMENTS

| | | | | |
|---|---|---|---|---|
| 5,926,086 A | * | 7/1999 | Escareno .............. | B60R 25/102 307/10.2 |
| 2003/0212480 A1 | * | 11/2003 | Lutter ................... | B60R 21/013 701/31.4 |
| 2004/0006479 A1 | * | 1/2004 | Tanaka ................ | B60R 16/0373 704/275 |
| 2004/0036584 A1 | * | 2/2004 | Briick ................... | B60R 25/102 340/426.13 |
| 2011/0307394 A1 | * | 12/2011 | Rzepecki ............... | G06Q 30/00 705/307 |
| 2015/0255063 A1 | | 9/2015 | Talwar | |
| 2016/0114745 A1 | * | 4/2016 | Ricci ..................... | H04W 12/06 701/2 |

* cited by examiner

*Primary Examiner* — Fariba Sirjani

(57) ABSTRACT

One general aspect includes a system for responsive activation of a vehicle feature for a vehicle, the system includes: an audio system configured to announce information and the vehicle feature; a memory configured to include one or more executable instructions; a controller configured to execute the executable instructions, and where the executable instructions enable the controller to: receive speech inputs from a vehicle occupant located in the vehicle, the speech inputs regarding the vehicle feature; retrieve vehicle feature information from vehicle feature information databases, in response to the received speech inputs; provide audio description information for the vehicle feature information; determine whether at least one received speech input includes a feature activation request; provide vehicle feature activation information to the vehicle feature, in response to a positive determination that the at least one received speech input includes the feature activation request.

17 Claims, 3 Drawing Sheets

RESPONSIVE ACTIVATION OF A VEHICLE FEATURE

INTRODUCTION

Today's vehicles are becoming more complicated and include advanced technical features which require some form of education. As a result, backend capabilities have been developed to responsively teach vehicle operators and passengers how to find, operate, and control these particular features. For instance, a vehicle occupant may request to learn more about how to change their seat orientation. Thus, these capabilities work well to teach the occupant how to activate and control certain vehicle features on their own. However, these features cannot further assist the occupant by remotely activating the vehicle feature. Nor can these capabilities incorporate the ability to recall past occupant behaviors or the widespread occupant population behaviors to suggest activation configurations likely to be desired by the occupant. It is therefore desirable to provide a method and system which can, in response to an occupant request, both describe a vehicle feature as well as activate that feature. It is also desirable to provide the method and system with the ability to activate the feature based on popular configurations.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of includes instructions that, when executed by data processing apparatus, cause the apparatus to perform the actions. One general aspect includes a method for responsive activation of a vehicle feature for a vehicle, the method includes: receiving one or more speech inputs (at a controller), from a vehicle occupant regarding a vehicle feature. The method also includes in response to the one or more received speech inputs, retrieving vehicle feature information (via the controller) from one or more vehicle feature information databases. The method also includes providing (via the controller) audio description information for the vehicle feature information, the audio description information configured to be announced through an audio system located in a vehicle. The method also includes determining (via the controller) whether at least one received speech input includes a feature activation request. The method also includes activating the vehicle feature (via the controller) in response to a positive determination that the at least one received speech input includes the feature activation request. Other embodiments of this aspect include corresponding computer systems, apparatus, and computer programs recorded on one or more computer storage devices, each configured to perform the actions of the methods.

Implementations may include one or more of the following features. The method further includes providing (via the controller) visual description information for the vehicle feature information, the visual description information configured to be exhibited on a visual display located in the vehicle. The method where the visual display is a heads-up display (HUD). The method further includes: determining (via the controller) whether the vehicle feature will permit remote activation in response to a positive determination that the at least one received speech input includes the feature activation request; and where the step of activating the vehicle feature (via the controller) further includes activating the vehicle feature remotely when both the positive determination has been made that the at least one received speech input includes the feature activation request and the positive determination has been made that the vehicle feature permits remote activation, otherwise: providing (via the controller) audio explanation information regarding one or more reasons why the vehicle feature does not permit remote activation, the audio explanation information configured to be announced through the audio system. The method where activating the vehicle feature incorporates popular feature configuration information to cause the activated vehicle feature to operate in a preconfigured manner. The method where the one or more vehicle feature information databases are uploaded to a memory located in a third-party computing device that is remote to a data center. The method where the controller implements an automated voice response system (VRS) to recognize the speech input from the vehicle occupant and provide the vehicle feature information audio description through the audio system. The method where the vehicle feature information includes information regarding one or more radio presets, vehicle seat orientation settings, HUD settings, HVAC settings or some combination thereof. Implementations of the described techniques may include hardware, a method or process, or computer software on a computer-accessible medium.

One general aspect includes a system for responsive activation of a vehicle feature for a vehicle, the system includes: an audio system configured to announce information; and the vehicle feature. The system also includes a memory configured to include one or more executable instructions; a controller configured to execute the executable instructions, and where the executable instructions enable the controller to: receive one or more speech inputs from a vehicle occupant located in the vehicle, the one or more speech inputs regarding the vehicle feature; retrieve vehicle feature information from one or more vehicle feature information databases, in response to the one or more received speech inputs; provide audio description information for the vehicle feature information to the audio system; determine whether at least one received speech input includes a feature activation request; provide vehicle feature activation information to the vehicle feature, in response to a positive determination that the at least one received speech input includes the feature activation request. Other embodiments of this aspect include corresponding computer systems, apparatus, and computer programs recorded on one or more computer storage devices, each configured to perform the actions of the methods.

Implementations may include one or more of the following features. The system where the executable instructions further enable the controller to provide visual description information for the vehicle feature information to a visual display located in the vehicle. The system where the visual display is a heads-up display (HUD). The system where the executable instructions further enable the controller to: determine whether the vehicle feature will permit remote activation in response to a positive determination that the at least one received speech input includes the feature activation request; and activate the vehicle feature remotely when both the positive determination has been made that the at least one received speech input includes the feature activation request and the positive determination has been made that the vehicle feature permits remote activation, otherwise:

provide audio explanation information regarding one or more reasons why the vehicle feature does not permit remote activation to the audio system. The system where the remote vehicle feature activation incorporates popular feature configuration information to cause the activated vehicle feature to operate in a preconfigured manner. The system where the one or more vehicle feature information databases are uploaded to a memory located in a third-party computing device that is remote to a data center. The system where the controller implements an automated voice response system (VRS) to recognize the speech input from the vehicle occupant and provide the vehicle feature information audio description through the audio system. Implementations of the described techniques may include hardware, a method or process, or computer software on a computer-accessible medium.

One general aspect includes a non-transitory and machine-readable medium having stored thereon executable instructions adapted to produce responsive activation of a vehicle feature for a vehicle, which when provided to a controller and executed thereby, causes the controller to: receive one or more speech inputs from a vehicle occupant located in the vehicle, the one or more speech inputs regarding the vehicle feature; retrieve vehicle feature information from one or more vehicle feature information databases, in response to the one or more received speech inputs; provide audio description information for the vehicle feature information to an audio system located in the vehicle; determine whether the one or more received speech inputs includes a feature activation request; provide vehicle feature activation information to the vehicle feature, in response to a positive determination that the at least one received speech input includes the feature activation request. Other embodiments of this aspect include corresponding computer systems, apparatus, and computer programs recorded on one or more computer storage devices, each configured to perform the actions of the methods.

Implementations may include one or more of the following features. The non-transitory and machine-readable medium further causes the controller to provide visual description information for the vehicle feature information to a visual display located in the vehicle. The non-transitory and machine-readable medium where the visual display is a heads-up display (HUD). The non-transitory and machine-readable medium further causes the controller to: determine whether the vehicle feature will permit remote activation in response to a positive determination that the at least one received speech input includes the feature activation request; and activate the vehicle feature remotely when both the positive determination has been made that the at least one received speech input includes the feature activation request and the positive determination has been made that the vehicle feature permits remote activation, otherwise: provide audio explanation information regarding one or more reasons why the vehicle feature does not permit remote activation to the audio system. The non-transitory and machine-readable medium where the one or more vehicle feature information databases are uploaded to a memory located in a third-party computing device that is remote to a data center. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Figure 1:
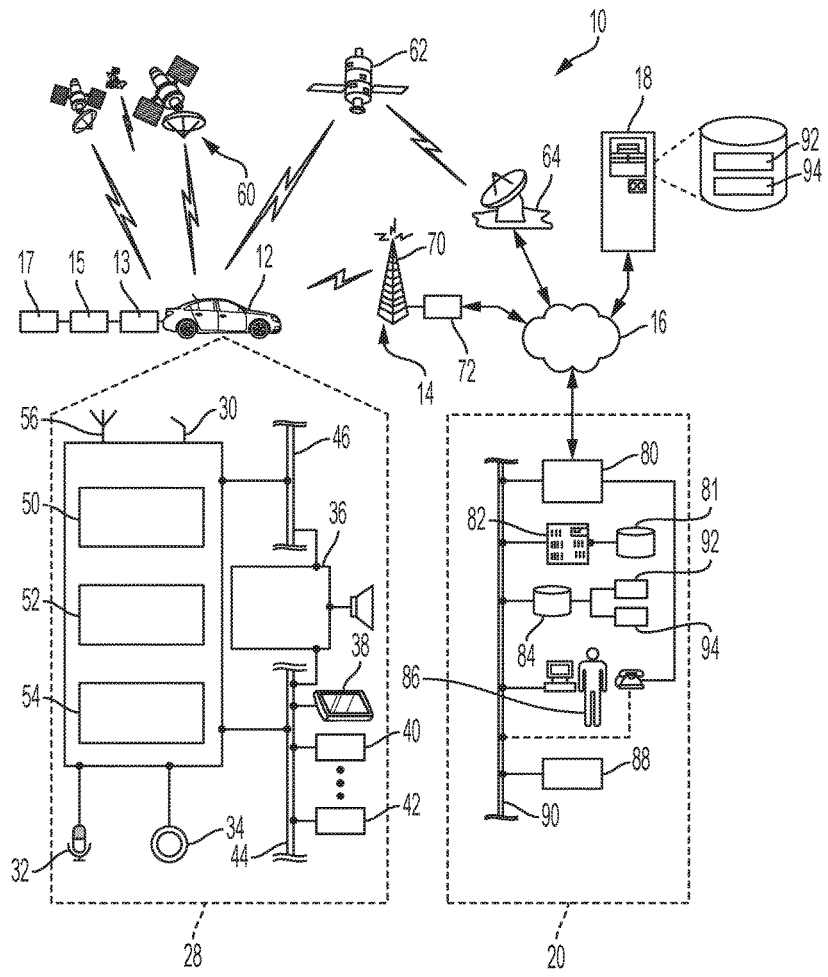
FIG. 1 is a block diagram depicting an exemplary embodiment of a communications system capable of utilizing the system and method disclosed herein.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The system and method described below provides for a real-time vehicle feature/attribute description as well as activation. As such, when a vehicle occupant inquiries about a vehicle feature (e.g., radio presets, vehicle seat orientation settings, HUD settings, HVAC settings, etc.), the system will provide a description of the vehicle feature. Moreover, the system will determine whether or not to activate the feature, which typically occurs after this description is provided. For example, when the automated voice response system (VRS) receives speech, a built-in automated speech recognition system reviews and analyzes the speech to detect words in the speech. For instance, when a user or vehicle occupant provides speech regarding a vehicle feature, he or she may say "Hey OnStar, tell me about my heated seats." The term "heated seats" can be identified as a vehicle feature by VRS. Subsequently, the system will locate a vehicle feature information database and identify description information corresponding to "heated seats." Once identified, the system will then retrieve the description information and provide it back to the occupant in an audible form. For instance, the system may activate the vehicle's stereo system to explain "there's a switch on the side of your seat that, when activated, will enable a heating coil in your seat to warm to a preselected temperature." In certain instances, the system may also provide the description in a visual form through a display (i.e., providing one or more pictures of the seat heating switch). The system will also determine whether the occupant would like the vehicle feature activated. As follows, the system may prompt the occupant make an activation decision using the stereo system. For instance, the system may ask "I can activate the most popular setting for you now.

Would you like that?" After being provided an answer in the affirmative, the system may then locate popular configuration information database and identify activation configuration information therefrom. Once identified, the system will then retrieve the popular configuration information and use it to activate the vehicle feature in a manner in conformity with the most popular settings of either the vehicle occupant themselves or for similar users of the vehicle feature.

Communication System

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a remotely located computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle features are generally shown in FIG. 1 and include, but are not limited to, a radio 13 configured to include one or more presets, a vehicle seat 15, and vehicle HVAC system 17. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display (HUD) reflected off of the windshield, and can be used to provide a multitude of input and output functions (i.e., capable of GUI implementation). Audio system 36 may also generate at least one audio announcement to announce such third-party contact information is being exhibited on display 38 and/or may generate an audio announcement which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Remote computer 18 can be one of a number of computers accessible via a private or public network such as the Internet. Each such computer 18 can be used for one or more purposes, such as a web server accessible by the vehicle via telematics unit 30 and wireless carrier 14. Other such accessible remote computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data (such as, for example, vehicle feature data and popular configuration data) or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12. Computer 18 can also store one or more databases that include information such as, but not limited to, a vehicle feature information database 92 and a popular feature configuration information database 94—both of which are discussed below.

Data center 20 is designed to provide the vehicle electronics 28 with a number of different system backend functions and, according to the exemplary embodiment shown here, generally includes one or more switches 80, servers 82, memory 84, live advisors 86, as well as an automated voice response system (VRS) 88 (i.e., a computer interface which responds to voice commands), all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from the memory 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or memory 84. Memory 84 can store account information such as vehicle dynamics information and other pertinent subscriber information. Memory 84 can also store one or more databases that include information such as, but not limited to, the vehicle feature information database 92 and popular feature configuration information database 94.

With regard to the vehicle feature information, database 92 may be a repository of vehicle owner's manual information regarding the location of certain features within the vehicle, how to activate such features, and what activation will cause. Aspects of such information may moreover be formatted to be announced through audio system 36 and/or supporting aspects of the information may moreover be formatted to be exhibited on display 38. For example, vehicle feature information pertaining to one or more radio presets may be configured to be announced through a vehicle's stereo speakers and may explain where in the vehicle interior such presets may be found (e.g., on the telematics display), how to change the radio station to a preset/change a preset (e.g., physically pressing on a virtual button via the telematics display), and that changing the radio station preset will allow the vehicle occupant to more easily find a desired radio station. Supporting information such as pictorial information and text may be exhibited through display 38 and may provide visual information corresponding to the presets location, what they look like, changing, and the outcome of changing such presets. In another example, vehicle feature information pertaining vehicle seat orientation settings may explain that orientation settings may be reconfigured through switches/buttons located on/near the seat (e.g., on the side of the seat), how to use the switches/buttons to change seat orientation, and how each button will modify the orientation of the seat. Supporting information may be exhibited through display 38 and may provide visual information corresponding to the switches/buttons location, how to operate the switches/buttons, and what using each button will do to the seat orientation. In another example, vehicle feature information pertaining to the heads-up display may explain where on the windshield the HUD is shown, what the HUD may exhibit, and how to change the location/orientation of the HUD on the windshield. Supporting information may be exhibited through display 38 and may provide visual information corresponding to what the HUD may exhibit, and how to change the location/orientation of the HUD on the windshield. In another example, vehicle feature information pertaining to the HVAC settings may explain where within the vehicle interior the HVAC controls are located, how to change the HVAC system settings, the parameters of the HVAC system, and how to use the HVAC controls. Supporting information may be exhibited through display 38 and may provide visual information corresponding to the HVAC controls location, how to use the HVAC controls and how to change the system settings.

With regard to the popular feature configuration information, database 94 may include information regarding the vehicle feature configurations historically known to be implemented by a vehicle occupant. For example, if the vehicle occupant has predominantly oriented the vehicle seat in which they sit in a certain manner, this information may be collected and recorded into database 94. In another example, the predominant position of the HUD at one specific location on the windshield may be collected and recorded into database 94. It should be understood that other popular configuration information relating to the radio presets, vehicle seat orientation, HUD settings, or HVAC settings may also be collected and recorded into database 94.

Database 94 may otherwise or additionally include information regarding the vehicle feature configurations historically known to be implemented by a selected population of vehicle occupants. This information may be specific to a certain subset of a vehicle occupant population. For example, information from a population of vehicles may be collected and recorded into database 94 to establish that a population of vehicle occupants in a certain age range (e.g., 24-30) enjoy certain radio stations presets (e.g., rock and roll channels, hip hop channels, country channels, etc.). This information may also be general to all vehicle occupants. For example, information from a population of vehicles may be collected and recorded into database 94 to establish that a majority of vehicle occupants prefer to orient their vehicle seat at an angle of 115 degrees. Skilled artisans will see that this information may be collected, organized, and established through one or more generally known techniques. It should also be understood that other popular configuration information relating to the radio presets, vehicle seat orientation, HUD settings, or HVAC settings may also be collected for a population of vehicle occupants.

Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Automatic Speech Recognition System

Figure 2:
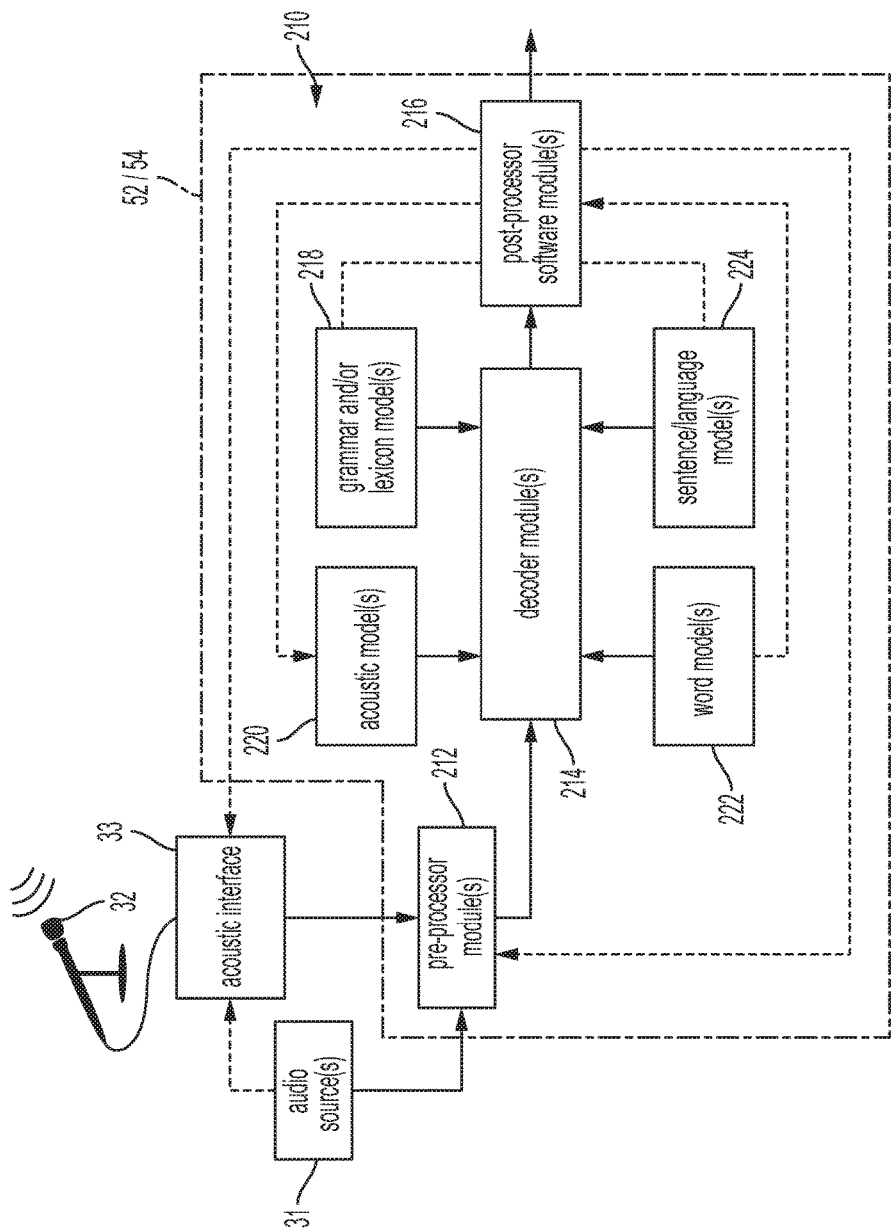
FIG. 2 is a is a block diagram depicting an embodiment of an automatic speech recognition (ASR) system implemented by the system and method disclosed herein.

Turning now to FIG. 2, there is shown an illustrative architecture for an ASR system 210 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific illustrative ASR system 210. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances: and one or more post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative illustrative embodiment, some or all of the ASR system 210 can be resident on, and processed using, computing equipment in a location remote from the vehicle 12 such as the call center 20 (e.g., VSR 88). For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30, distributed across the call center 20 and the vehicle 12 in any desired manner, and/or resident at the call center 20.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 transforms the continuous stream of digital speech data into discrete sequences of acoustic parameters. More specifically, the processor 52 executes the pre-processor module(s) 212 to segment the digital speech data into overlapping phonetic or acoustic frames of, for example, 10-30 in duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an MINI engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian MINI process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The MINI can also include a statistical distribution called a mixture of diagonal Gaussians, which yields a likelihood score for each observed feature vector of each subword, which scores can be used to reorder the N-best list of hypotheses. The MINI engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Illustrative parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 receives the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

The method or parts thereof can be implemented in a computer program product embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Method

Figure 3:
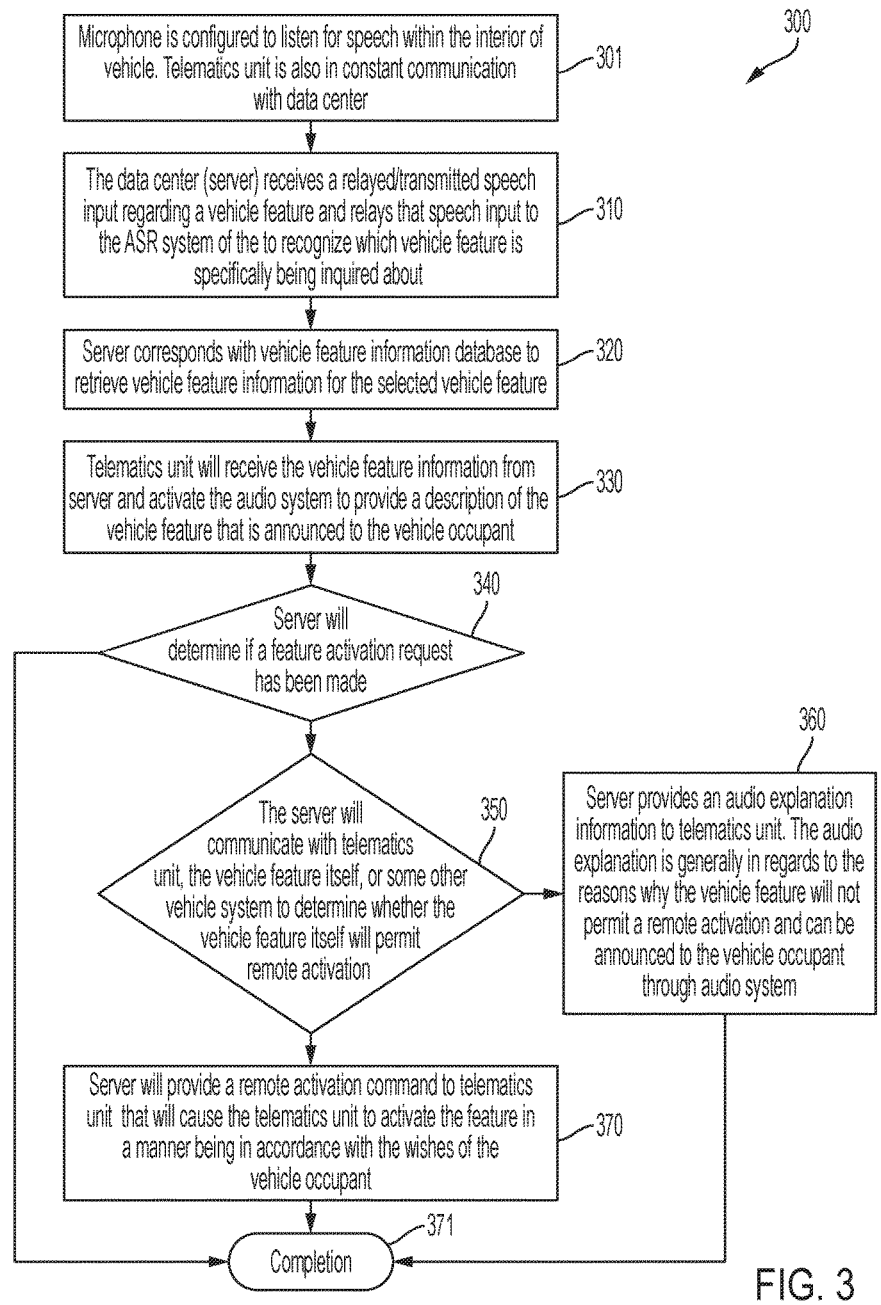
FIG. 3 is a flow chart depicting an embodiment of a method of responsive activation of a vehicle feature.

Turning now to FIG. 3, there is shown an exemplary embodiment of a method 300 of responsive activation of a vehicle feature for a vehicle. Method 300 may moreover activate the vehicle feature based on popular feature configuration information so as to cause the activated vehicle feature to operate in a preconfigured manner. Aspects of this method may be executed through the backend data controller 81 (and server 82), for example, implementing the functionality of VRS 88 (including the incorporation of ASR system 210), stored at memory 84. In certain embodiments, peripheral aspects are executed through remotely located computer 18, for example, to retrieve of certain information from vehicle feature information database 92 and/or popular feature configuration information database 94. In certain embodiments, peripheral aspects are executed through telematics unit 30, for example, to coordinate with audio system 36 to announce the vehicle feature information and/or to coordinate with display 38 to exhibit the vehicle feature information as well as assist in vehicle feature activation.

In this method, VRS 88 is preconfigured to implement ASR system 210 to recognize certain speech inputs from one or more vehicle occupants as being related to one or more vehicle features located on their respective vehicle. Telematics unit 30 is preconfigured with a backend subscription service that enables one or more vehicle occupants to have real-time communications with VRS 88. Method 300 begins with 301 in which microphone 32 is configured to listen for speech within the interior of vehicle 12. In 301, moreover, telematics unit 30 is in constant communication with data center 20, for example, via wireless carrier system 14 for the purposes of the subscription service. Thus any recognized speech input picked up by microphone 32 will be relayed/transmitted to data center 20 (i.e., VSR 88) through telematics unit 30 and carrier system 14.

Method 300 begins with the server 52 receiving a relayed/transmitted speech input regarding a vehicle feature, at 310. As follows, for example, the vehicle occupant may vocally exercise their backend subscription through telematics unit 30 and request information regarding a selected vehicle feature (e.g., radio presets). Consequentially, upon the speech input information for the vehicle feature request being received by ASR system 210, on behalf of VRS 88, the server 52 will analyze the information to recognize which vehicle feature is specifically being inquired about.

Once the specific vehicle feature is identified, at 320, server 52 will correspond with vehicle feature information database 92 to retrieve vehicle feature information for the selected vehicle feature. In one example, as discussed above, database 92 is located in memory 84. As such, server 52 is required to communicate with memory 84 via local area network 90 to retrieve the vehicle feature information. In an alternative example, as also discussed above, database 92 is located in one or more computers 18. As such, server 52 is required to communicate with computer 18 via the wireless carrier system 14 and/or land communications network 16. Moreover, such information may be formatted to be played via an audio system and/or may be formatted to be exhibited via a display. Server 52 will subsequently transmit the retrieved vehicle feature information to vehicle 12, for example, through telematics unit 30.

At 330, telematics unit 30 will receive the vehicle feature information from server 82, for example, through wireless carrier system 14. Upon receiving the vehicle feature information, telematics unit 30 will activate audio system 36. Telematics unit 30 will then produce the vehicle feature information to audio system 36 so that a description of the vehicle feature may be announced to the vehicle occupant. As exemplified above, in those instances the vehicle feature information pertains to one or more radio presets, audio system 36 may announce a description of the radio presets that explains things such as where in the vehicle interior such presets can be found, how to change the radio station to a preset/modify a preset, and explain that modifying the radio station preset will allow the vehicle occupant to more easily find a desired radio station.

In those embodiments in which the vehicle feature information also includes supporting information that can be exhibited through a display, telematics unit 30 will also activate display 38. Telematics unit 30 will then produce the vehicle feature information to display 38 so that a visual image display of aspects for the vehicle feature may be exhibited in the vehicle interior. As exemplified above, when the vehicle feature information pertains to one or more radio presets, display 38 may exhibit pictorial information and text that discloses one or more preset locations, what the presets look like, how to change the presets, and the outcome of changing such presets. Telematics unit 30 may also correspond with one or more vehicle systems/components and/or GPS module 40 to determine which display to implement—the touch screen on the instrument panel or the HUD reflected off of the windshield. For instance, telematics unit 30 may gather information from server 82 and may subsequently route the images to the HUD 38 when the vehicle is moving above a certain speed (e.g., above 10 mph) and may subsequently route the images to the instrument panel touch screen when the vehicle is stationary (for at least a certain amount of time).

In step 340, server 52 will determine if a feature activation request has been made. This request may have been made during the initial request for information regarding a selected vehicle feature. For example, the vehicle occupant may request feature activation while requesting explanation information regarding that feature. Alternatively, this activation request may be made after the vehicle feature information has been sufficiently announced and/or displayed (step 320). For instance, the activation request may be made by the vehicle occupant after being prompted when the vehicle feature description announcement is complete. If server 52 determines that the vehicle occupant has made a feature activation request, method 300 will move to step 350. Otherwise, if it is determined no feature activation request has been made or such that the occupant does not actually want a feature activation, method 300 will move to completion 371. In this step, telematics unit 30 may also activate display 38 to exhibit visual cues to assist the vehicle occupant the vehicle occupant in requesting a feature activation.

In step 350, server 52 may start proceeding to activate the vehicle feature in response to a positive determination made in step 340. In one or more embodiments of method 300, server 52 may communicate with the popular feature configuration information database 94 to preconfigure the manner in which the feature may be activated. Similar to the vehicle feature information database 92, discussed above, the popular feature configuration information database 94 may be located in memory 84 and/or the database 94 may be located in one or more of the computers 18. Server 54 may further provide vehicle occupant user history to support the findings of the popular feature user configuration information database 94 and support the configurations of the activating feature. Providing support by the user history can implement broader analytics and statistical models which may be adapted over time. This database communication may occur after the vehicle occupant has been prompted to see if they desire to have their selected feature activated in a preconfigured manner which is in accordance with their own past personal usages for the feature or after they have been prompted to see if they desire to have the selected feature activated in a preconfigured manner which is in accordance with popular configurations (i.e., from a selected population or general population). In essence, database 94 provides information that enables server 52 to activate the feature in a capacity that is congruent with contextual cues.

Step 350 includes server 52 communicating with telematics unit 30, the vehicle feature itself, or some other vehicle system to make a determination as to whether the vehicle feature itself will permit remote activation. For example, when the vehicle feature is a radio preset, server 52 will communicate with telematics unit 30, or in certain embodiments—directly with the vehicle's radio, to inquire whether the presets may be activated by a remote entity (e.g., reconfigured, set radio station, change current radio station, etc.). Upon such an inquiry, if it is determined that server 52 may remotely activate method 300 will move to step 370. Otherwise method 300 will move to step 360.

In step 360, since server 52 has determined that a remote activation option is not available for the selected vehicle feature, sever 54 will provide audio explanation information to telematics unit 30, or in certain embodiments—directly to audio system 36. This audio explanation information is generally in regards to the reasons why the vehicle feature will not permit a remote activation and can be announced to the vehicle occupant through audio system 36. For example, when the vehicle feature is the vehicle seat orientation, server 52 may provide an audio explanation that, when provided to audio system 36, announces to the vehicle occupant that the embodiment of the seat switches/buttons require manual adjustments to reorient the seat. Upon subsequent completion of step 360, method 300 will move to completion 371. In this step, sever 54 may also provide supporting information that can be exhibited through a display.

In step 370, since server 52 has determined that remote activation is enabled for the selected vehicle feature, sever 54 will provide a remote activation command to telematics unit 30 (or in certain embodiments—directly to the vehicle feature). This command will activate the feature in a manner being in accordance with the wishes of the vehicle occupant. For example, when the vehicle feature is the vehicle seat orientation, server 52 may provide a command that, when provided to telematics unit 30, directly or indirectly (e.g., via a body control module 42), will cause the seat to reorient itself in a manner that conforms to the vehicle occupant's desires. In essence, step 370 is completed when server 52 has positively determined that the vehicle occupant desires to activate a selected vehicle feature and the vehicle feature itself permits remote activation. Upon subsequent completion of step 370, method 300 will move to completion 371.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for".

What is claimed is:

1. A method for responsive activation of a vehicle feature for a vehicle, the method comprising:
    receiving one or more speech inputs, at a controller, from a vehicle occupant regarding a vehicle feature;
    in response to the one or more received speech inputs, retrieving vehicle feature information, via the controller, from one or more vehicle feature information databases;
    providing, via the controller, audio description information for the vehicle feature information, the audio description information configured to be announced through an audio system located in a vehicle;
    determining, via the controller, whether at least one received speech input comprises a feature activation request;
    activating the vehicle feature, via the controller, in response to a positive determination that the at least one received speech input comprises the feature activation request;
    determining, via the controller, whether the vehicle feature will permit remote activation in response to a positive determination that the at least one received speech input comprises the feature activation request; and
    wherein the step of activating the vehicle feature, via the controller, further comprises activating the vehicle feature remotely when both the positive determination has been made that the at least one received speech input comprises the feature activation request and the positive determination has been made that the vehicle feature permits remote activation, otherwise:
        providing, via the controller, audio explanation information regarding one or more reasons why the vehicle feature does not permit remote activation, the audio explanation information configured to be announced through the audio system.

2. The method of claim 1, further comprising providing, via the controller, visual description information for the vehicle feature information, the visual description information configured to be exhibited on a visual display located in the vehicle.

3. The method of claim 2, wherein the visual display is a heads-up display (HUD).

4. The method of claim 1, wherein activating the vehicle feature incorporates popular feature configuration information to cause the activated vehicle feature to operate in a preconfigured manner.

5. The method of claim 1, wherein the one or more vehicle feature information databases are uploaded to a memory located in a third-party computing device that is remote to a data center.

6. The method of claim 1, wherein the controller implements an Automated Voice Response System (VRS) to recognize the speech input from the vehicle occupant and provide the vehicle feature information audio description through the audio system.

7. The method of claim 1, wherein the vehicle feature information comprises information regarding one or more radio presets, vehicle seat orientation settings, HUD settings, HVAC settings or some combination thereof.

8. A system for responsive activation of a vehicle feature for a vehicle, the system comprising:
    the vehicle including an audio system configured to announce information, and the vehicle feature;
    a memory configured to comprise one or more executable instructions; and
    a controller configured to execute the executable instructions,
    wherein the executable instructions enable the controller to:
        receive one or more speech inputs from a vehicle occupant located in the vehicle, the one or more speech inputs regarding the vehicle feature;
        retrieve vehicle feature information from one or more vehicle feature information databases, in response to the one or more received speech inputs;
        provide audio description information for the vehicle feature information to the audio system;
        determine whether at least one received speech input comprises a feature activation request; and
        provide vehicle feature activation information to the vehicle feature, in response to a positive determination that the at least one received speech input comprises the feature activation request;
    determine whether the vehicle feature will permit remote activation in response to a positive determination that the at least one received speech input comprises the feature activation request; and
    activate the vehicle feature remotely when both the positive determination has been made that the at least one received speech input comprises the feature activation request and the positive determination has been made that the vehicle feature permits remote activation, otherwise:
        provide audio explanation information regarding one or more reasons why the vehicle feature does not permit remote activation to the audio system.

9. The system of claim 8, wherein the executable instructions further enable the controller to provide visual description information for the vehicle feature information to a visual display located in the vehicle.

10. The system of claim 9, wherein the visual display is a heads-up display (HUD).

11. The system of claim 8, wherein the remote vehicle feature activation incorporates popular feature configuration information to cause the activated vehicle feature to operate in a preconfigured manner.

12. The system of claim 8, wherein the one or more vehicle feature information databases are uploaded to a memory located in a third-party computing device that is remote to a data center.

13. The system of claim 8, wherein the controller implements an Automated Voice Response System (VRS) to recognize the speech input from the vehicle occupant and provide the vehicle feature information audio description through the audio system.

14. A non-transitory and machine-readable medium having stored thereon executable instructions adapted to produce responsive activation of a vehicle feature for a vehicle, which when provided to a controller and executed thereby, causes the controller to:
receive one or more speech inputs from a vehicle occupant located in the vehicle, the one or more speech inputs regarding the vehicle feature;
retrieve vehicle feature information from one or more vehicle feature information databases, in response to the one or more received speech inputs;
provide audio description information for the vehicle feature information to an audio system located in the vehicle;
determine whether the one or more received speech inputs comprises a feature activation request;
provide vehicle feature activation information to the vehicle feature, in response to a positive determination that the at least one received speech input comprises the feature activation request;
determine whether the vehicle feature will permit remote activation in response to a positive determination that the at least one received speech input comprises the feature activation request; and
activate the vehicle feature remotely when both the positive determination has been made that the at least one received speech input comprises the feature activation request and the positive determination has been made that the vehicle feature permits remote activation, otherwise:
provide audio explanation information regarding one or more reasons why the vehicle feature does not permit remote activation to the audio system.

15. The non-transitory and machine-readable medium of claim 14, further causes the controller to provide visual description information for the vehicle feature information to a visual display located in the vehicle.

16. The non-transitory and machine-readable medium of claim 14, wherein the visual display is a heads-up display (HUD).

17. The non-transitory and machine-readable medium of claim 14, wherein the one or more vehicle feature information databases are uploaded to a memory located in a third-party computing device that is remote to a data center.

* * * * *